July 15, 1969  E. E. ROSS ET AL  3,455,307
CORN CUTTING MACHINE
Filed Nov. 4, 1966  3 Sheets-Sheet 1
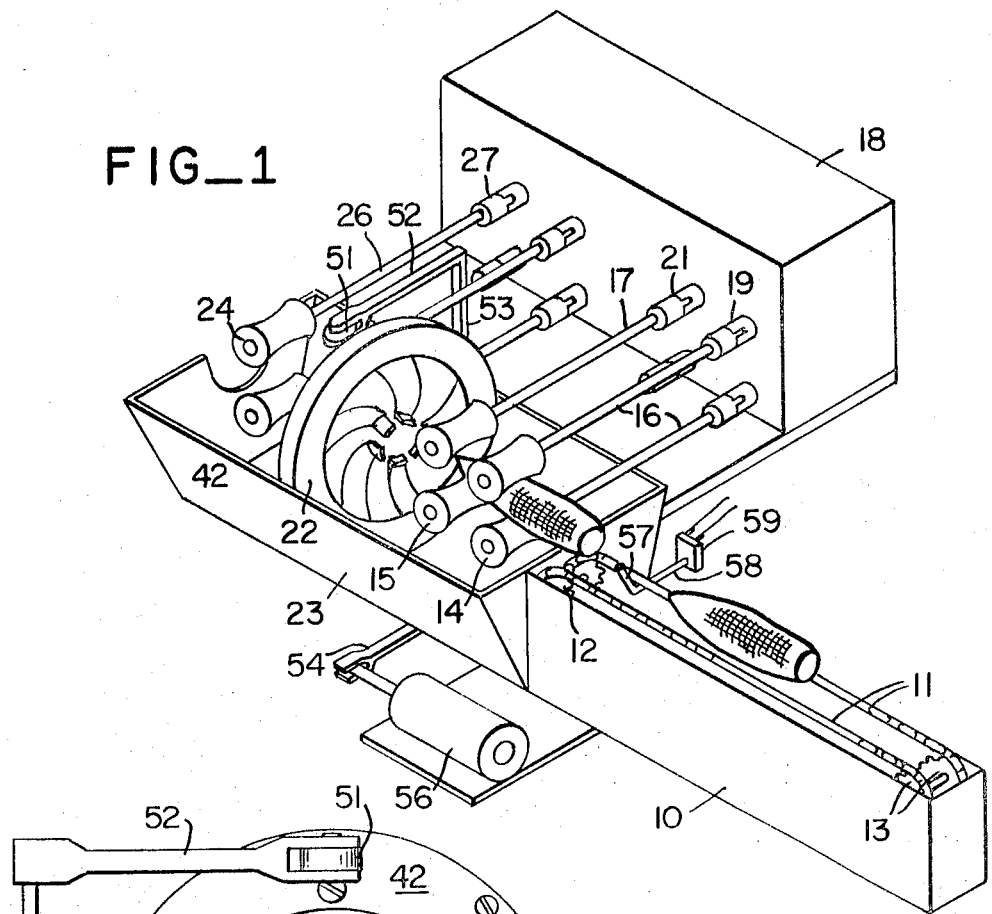
FIG_1
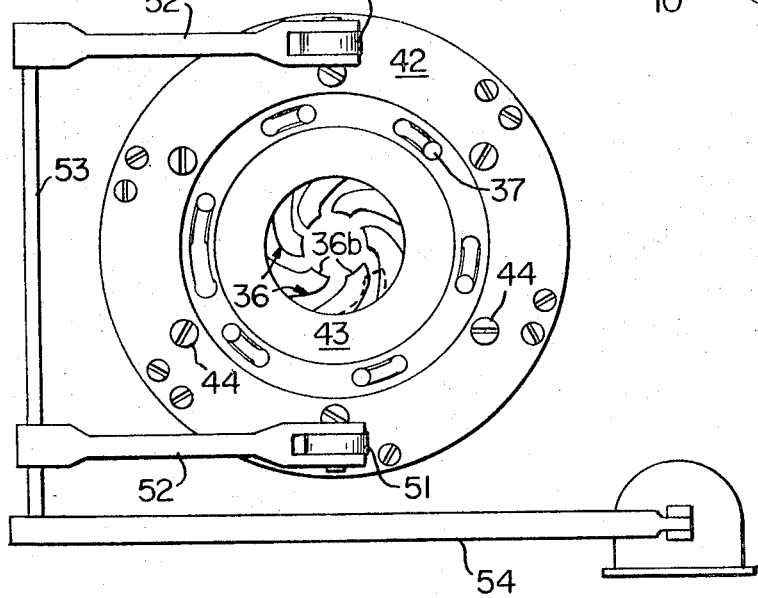
FIG_2
INVENTORS
EDWARD E. ROSS
BY JACK CUNNINGHAM
ATTORNEYS

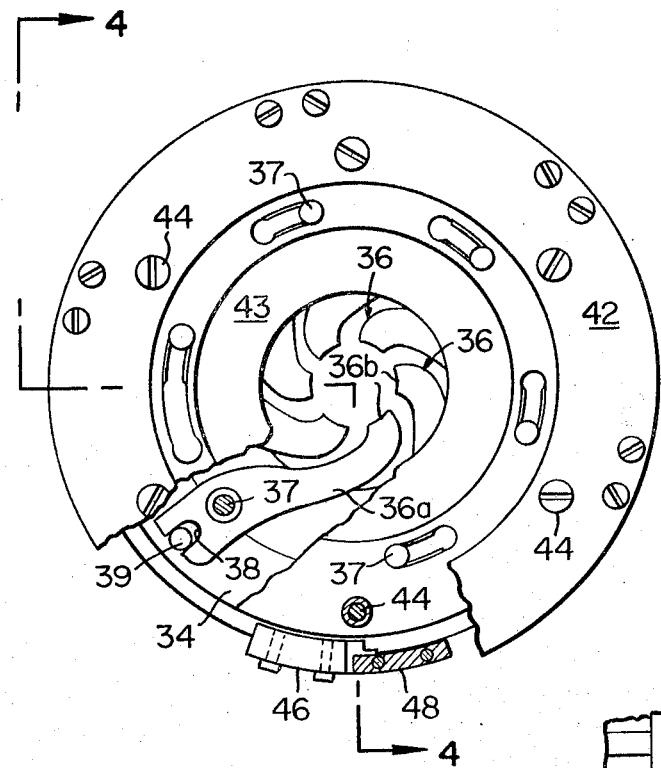
FIG_3
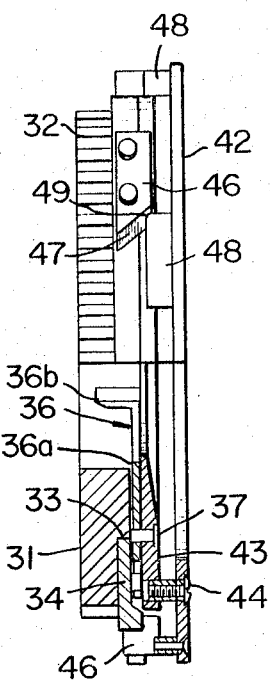
FIG_4
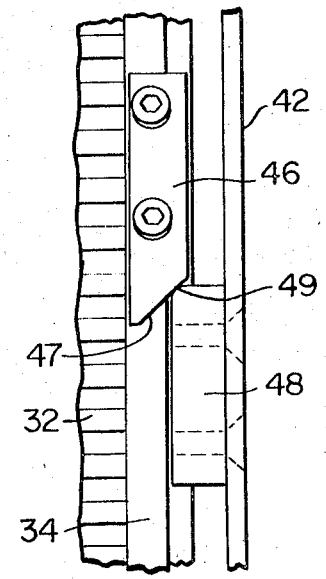
FIG_5
INVENTOR.
EDWARD E. ROSS
BY JACK CUNNINGHAM
ATTORNEYS

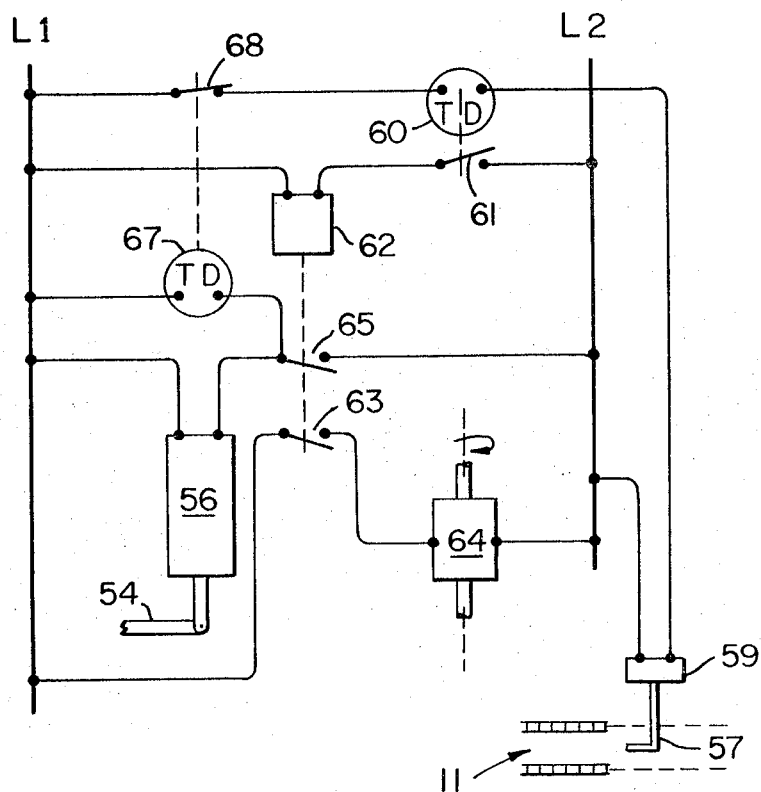
FIG_6

United States Patent Office 3,455,307
Patented July 15, 1969

3,455,307
CORN CUTTING MACHINE
Edward E. Ross, Lafayette, and Jack Cunningham, San Francisco, Calif., assignors to California Packing Corporation, San Francisco, Calif., a corporation of New York
Filed Nov. 4, 1966, Ser. No. 591,998
Int. Cl. A01f *11/06*
U.S. Cl. 130—9                                             4 Claims

ABSTRACT OF THE DISCLOSURE

A corn cutting machine of the type in which ears of corn are fed and pass through a rotary cutter assembly for cutting kernels from the cob. A rotary cutter assembly is provided which has a plurality of cutter knives which are yieldably urged in a direction toward the axis of rotation. Means is provided which can be actuated to cause retraction of the cutting blades while the assembly is in rotation. The ears of corn are fed by conveyor means toward one side of the cutter assembly and in alignment with the axis of rotation. Means is provided which is responsive to jamming of corn ears against the cutter assembly, and this serves to automatically actuate the means which causes retraction of the cutter knives.

---

This invention relates generally to machines for cutting kernels of corn from the cob. Such machines are commonly used in food processing or canning plants.

One type of corn cutting machine that has met with commercial success consists of a rotary cutter assembly having a plurality of spring-loaded cutting knives arranged to operate about the axis of rotation. The ears of corn are fed to the rotary cutter assembly one at a time and in alignment with the axis of rotation, with the small end first. The means employed for this purpose may consist of a feed chain or other suitable conveyer on which the ears of corn are placed one at a time, together with spring-loaded feed rolls which receive the ears from the conveyer chain and present them one at a time to the rotary cutter assembly. The knife blades of the cutter assembly follow the contour of the corn cob and remove only the kernels. Ejector rolls engage and pull the cob through the cutter assembly and eject the cob from the machine.

Proper operation of such a machine may be interrupted by ears becoming stuck in or on the cutting knives. Assuming that the rotary cutter assembly is of the type described above, the jam must be cleared by stopping the machine and then prying the stuck ear from the blades and feed rolls. It has been proposed to alleviate this difficulty by constructing the rotary cutting assembly whereby the cutter knives can be temporarily retracted, thus freeing the knives from the stuck ear. However, such prior assemblies have been relatively complicated and expensive. Their construction has been such that they cannot be readily installed on existing and older model corn cutters. The machines in which they have been used have required a manual operation to retract the knives. This increases over-all machine shut-down time and operating costs.

In general it is an object of the present invention to provide a novel rotary cutter assembly for corn cutting machines which will overcome the disadvantages of prior cutter assemblies as described above.

Another object of the invention is to provide a cutter assembly which is relatively simple in its construction and operation, and which can be actuated either manually or automatically to clear the knives from a stuck cob.

Another object of the invention is to provide a corn cutter machine having novel automatic means which clears the rotary cutter assembly with respect to a stuck cob, after which the machine continues normal operation, all without manual operations.

Additional objects and features of the invention will appear from the following description in which the preferred embodiments have been set forth in detail in conjunction with the accompanying drawing.

Referring to the drawing:

FIGURE 1 is a schematic perspective view showing a corn cutting machine incorporating the invention;

FIGURE 2 is a schematic end elevation looking toward the entry end of the cutter assembly;

FIGURE 3 is a detail of the cutter assembly, looking toward the entry end of the same and with portions broken away to illustrate the working parts;

FIGURE 4 is a half section taken on the line 4—4 of FIGURE 3;

FIGURE 5 is a detail showing the interacting cam elements; and

FIGURE 6 is a circuit diagram showing electrical connections for automatic operation.

The corn cutter machine illustrated schematically in the drawing is of the general type disclosed in Kerr 2,323,092. As previously stated, such a machine incorporates a chain conveyor or other conveying device on which the ears are placed one at a time with their smaller ends facing forwardly. The ears are transferred one by one from the chain conveyor to feed rolls which are spring-loaded and which present the ear to the rotary cutter assembly. Another pair of discharge rolls located on the discharge side of the cutter assembly receives the cob, thereby pulling the cob through the cutter assembly and ejecting it from the machine.

The present invention consists of a novel cutter assembly which can be installed in either new or existing corn cutter machines, and which incorporates novel means adapted to be energized either manually or automatically for retracting (i.e., opening) the knife blades. One embodiment of the invention, for automatic operation, involves use of means in conjunction with the conveyor for detecting a jammed condition, together with means for temporarily retracting the blades of the rotary cutter assembly when such jammed condition occurs, after which the machine is restored to normal operation.

FIGURE 1 schematically shows parts of a corn cutter machine of the type disclosed in Kerr 2,323,092, and particularly the parts of the machine which are concerned with the present invention. The part 10 of the machine frame serves to mount a conveyor consisting of the endless parallel conveyor chains 11 carried by the sprockets 12 and 13. One of the sprockets is driven at a predetermined rate by a suitable drive connection (not shown). Ears of corn are shown being carried along by the conveyor chain, it being understood that the machine includes suitable means for orienting and depositing the ears upon the conveyor chain, with the smaller ends of the ears faced toward the direction of movement. This means may be of the type disclosed and claimed in copending application Ser. No. 530,449, filed Feb. 28, 1966.

Two pairs of feed rolls 14 and 15 are disposed adjacent the discharge end of the conveyor chain 12, and serve to engage the ears somewhat in the manner illustrated. Suitable means (not shown) is employed to journal and load these rolls whereby the rolls of each pair are yieldably urged toward each other and into engagement with the ear. This may be spring-loading of the rolls in the general manner disclosed in said Patent 2,323,092. The two pairs of rolls are shown attached to the shafts 16 and 17 and these shafts are shown connected to power driven shafts within the housing 18 through the universal joints 19 and 21.

A rotary cutter assembly 22 is mounted near the rolls 15 and is adapted to act upon the ears for removing the corn kernels. The removed kernels are received by the collection hopper 23, which connects with suitable conduit or conveying means for transferring the removed kernels to further processing operations. Another pair of rolls 24 are disposed near the rear or discharge side of the cutter assembly 22. These rolls are shown secured to shafts 26 which connect with power shafts within the housing 18, through the universal joints 27. They are likewise journalled and loaded as by use of means disclosed in Patent 2,787,273, whereby they are yieldably urged toward each other and against the cob being delivered through the rotary cutter.

The speed of rotation of the feed and discharge rolls is such that an engaged ear is moved in the direction of its axis at a speed substantially greater than the speed of movement when resting upon the chain conveyor 11. Therefore, when an ear is engaged by the feed rolls, it is accelerated in a forward direction, thus leaving a substantial space between its rear larger end and the forward smaller end of the next succeeding ear.

The preferred construction of the rotary cutter assembly may be understood by reference to FIGURES 2-5. It consists of an annular drive or mounting member 31 shown provided with gear teeth 32. The mounting member is machined to provide a shoulder 33 about which the annular follower member 34 is loosely carried. A plurality of knives 36 are carried by the mounting member 31, and each knife consists of a flat arm-like portion 36 and an inner cutting blade 36b. The knives are pivotally carried by the mounting member 31 by the circumferentially spaced pins 37 that are fixed to the mounting member and which engage holes intermediate the ends of the arm portions 36a.

The outer ends of the knives 36 have pin and slot connections with the follower member 34. Thus the outer extremities of the arm portions 36a are provided with slots 38 which are engaged by circumferentially spaced pins 39 mounted upon the follower member 34. With this arrangement, relative angular movement between the mounting and follower members serves to cause conjoint angular movements of the knives about the pivot pins 37. This in turn serves to move the cutting blades 36b toward or away from the axis of rotation.

As thus far described, the cutter assembly is substantially the same as assemblies which have been used in the past on corn cutter machines. In the prior assemblies a suitable retaining ring is normally engaged with the ends of the pivot pins 37 to retain the parts in assembled form. Also suitable spring means (not shown) is provided for urging the follower member relative to the mounting member whereby the cutting blades are yieldably urged to limiting positions surrounding the axis of rotation. When a corn ear is passed through the assembly, the cutting blades move outwardly in accordance with the contour of the ear. Such movement of the knives is accommodated by relative angular movements between the follower and the mounting members.

The rotary cutter assembly of the present invention includes additional parts to facilitate manual or automatic retraction of the cutting knives. Thus an annular thrust member 42 is disposed adjacent the discharge side of the assembly. It is carried by an annular member 43 which serves as a retainer for the knives. The attachment of member 42 is such that it can be moved axially relative to the knives and the mounting member 31, but cannot be turned relative to the mounting member. Thus a plurality of circumferentially spaced pins 44 are mounted on the retainer member 43 and are slidably accommodated in openings formed in the thrust member 42.

Interacting cam elements are provided on the follower 34 and the thrust member. Thus segments 46 having cam faces 47 are attached to the periphery of the follower 34. Segments 48 having camming surfaces in the form of rounded corners 49 are attached to the thrust member 42. When the thrust member 42 is moved axially toward the driving member 31, the cam faces 47 and 49 act to effect relative rotation between the follower and the drive member, thereby causing the knives to be retracted.

The machine illustrated in FIGURE 1 is equipped with means for applying thrust to the member 42 to cause the knives to be retracted while the assembly is rotating. This means consists of rollers 51 which are disposed adjacent diametrically opposite potrions of the cutter assembly. These rollers are mounted upon the free ends of arms 52, which in turn are secured to the rod or bar 53. Rod 53 is suitably journalled to the frame of the machine and its lower end is shown provided with an operating arm 54. When arm 54 is moved manually or by power means to the right as viewed in FIGURE 1, the rollers 51 are brought against the peripheral margins of the thrust member 42, and this member is then moved axially toward the mounting member 31, with the result that cam segments 46 are caused to engage the segments 48, thereby effecting limited angular rotation of the follower member 34 relative to the mounting member 31. As previously explained, such relative angular movement between the follower and mounting members serves to rotate the knives 36, whereby the cutting blades 36b of these knives are retracted. In FIGURE 2 one knife is shown by dotted lines in retracted position. The spring loading between the mounting and follower members is such that when force applied to arm 54 is released, the knives return to their inner positions as illustrated in FIGURE 3.

In the foregoing, certain details of the machine have not been illustrated in the drawing or described. Such details may be in accordance with corn cutter machines of the type previously described, such as the machine disclosed in patent 2,323,092, or in the more recent Patents 2,577,530 and 2,787,273. Particularly these patents show how such a cutter assembly is disposed within a housing with the gear teeth 32 engaging a driving pinion.

In place of using manual means for operating the lever 54, we prefer to use power means, such as an electrical solenoid 56. Also it is desirable to energize the solenoid 56 in response to a jamming of the machine, whereby the retraction of the knives of the outer assembly, and the clearing of the machine, takes place automatically. To effect such automatic operation, we have shown a pivoted sensing finger 57 carried by the rotatable shaft 58. Normally the finger is urged by suitable spring means (not shown) to a generally upright position as illustrated in FIGURE 1. When an ear of corn passes over the finger 57, the finger is depressed to effect operation of the electrical switch 59. As illustrated in FIGURE 6, circuitry connected to the switch 59 can include a time delay switch 60, the contacts 61 of which control the relay switch 62. The contacts 63 of the relay switch control an electrically operated clutch 64. Additional contacts 65 control the solenoid 56 for operating the lever 54. The drive to the chain conveyer 11 is through the clutch 64. Therefore, when the clutch 64 is disengaged, the conveyer chain stops. The time delay switch 60 is set whereby if the finger 57 remains depressed for more than a predetermined period of time, which period is more than the transit time required for one ear of corn to travel across the finger at the speed of the conveyer 11, the contacts 61 are closed to energize relay switch 62 to closed contacts 63 and disengage clutch 64. When the machine is operating normally, the accelerated movement imparted to the ear being engaged by the feed rolls 14 permits the finger 57 to momentarily move to an elevated position, thus preventing the closing of circuit 62. Time delay switch 67 momentarily opens its contacts 68 a predetermined time interval after there has been ample time for clearing the machine. If the machine has not been cleared, the cycle described above is repeated. It is to be understood that other forms of sensors can be used in place of finger 57 and switch 59 to signal the presence of an ear and to provide means responsive to failure of the feed roll means to take off an ear from the conveyer. For example, we can employ a photoswitch or electric eye operated by a light beam directed across the path traversed by ears entering the machine from the conveyer 11. Also we can employ a switch that is recurrently activated by the spreading apart of the feed rolls 14.

Operation of the machine with the automatic features described above is as follows. During normal operation, the ears of corn are advanced one behind the other in the manner illustrated in FIGURE 1, with the small ends of the ears moving in the direction of travel. Immediately following the engagement of an ear by the feed rolls 14, this ear is accelerated in its movement toward the rotary cutter assembly, with the result that the sensing finger 57 is permitted to elevate, thus preventing the closing of contacts 61. In the event jamming should occur due to the impalement of an ear or cob upon one of the knife blades, the ear engaged by the feed rolls 14 and 15 is no longer advanced, with the result that the sensing finger 57 is held down for a sufficient period of time to cause the closing of contacts 61. As previously explained, this results in disengaging the drive to the chain conveyer, and it also causes the solenoid 56 to be energized, with the result that the annular thrust member 42 of the rotary cutter assembly is moved axially to cause the knives to be retracted. Retraction of the knives generally causes the impaled cob to be disengaged, after which the machine is in condition for normal operation. After a predetermined interval of shutdown, the contacts 68 and then 61 are automatically opened, with the result that drive to the chain conveyer is automatically reestablished and the machine continues its normal operation.

We claim:
1. In a corn cutting machine of the type in which ears of corn are fed endwise through a rotary cutting assembly for cutting kernels from the cob, a rotary cutter assembly comprising a plurality of cutter knives, means forming a part of the assembly for yieldably urging the knives in a direction toward the axis of rotation, means adapted to be actuated to effect retraction of said cutting knives while the assembly is in rotation, conveyer means for feeding corn ears toward one side of the cutter assembly and in alignment with the axis of rotation, and means responsive to a jamming of corn ears against the cutter assembly for automatically actuating said means for effecting retraction of the cutting knives.

2. A corn cutting machine as in claim 1 in which the means for feeding corn ears toward one side of the cutter assembly comprises a conveyer of the endless type, feed rolls positioned between the conveyer means and the rotary cutter assembly and adapted to engage ears of corn presented by the conveyer and to feed the same to the cutting assembly, said feed rolls serving to remove ears from the conveyer means at a speed greater than the speed of movement on the conveyer means, sensing means associated with the conveyer means, said sensing means being responsive to failure of the feed roll means to take off an ear from the conveyer means, and means controlled by said sensing means for energizing said means for retracting the cutting knives.

3. A corn cutting machine as in claim 2 in which the sensing means includes a sensing finger movable between lower and raised positions and yieldably urged toward raised position, said sensing finger being positioned near the discharge end of the conveyer means and adapted to be retained in its lower position by corn ears being conveyed to the feed rolls.

4. A corn cutting machine as in claim 2 together with means for interrupting operation of the conveyer means when said last-named means is energized for retracting the cutting knives.

References Cited
UNITED STATES PATENTS 2,214,285   9/1940   Schmidt  _____ 130—9

ANTONIO F. GUIDA, Primary Examiner